United States Patent [19]

Kreuzer

[11] Patent Number: 5,271,092
[45] Date of Patent: Dec. 14, 1993

[54] METHOD FOR TRANSMITTING A PERMISSION SIGNAL FOR THE OPERATION OF A ROBOT

[75] Inventor: Wolfgang Kreuzer, Fürth, Fed. Rep. of Germany

[73] Assignee: Siemens Aktiengesellschaft, Munich, Fed. Rep. of Germany

[21] Appl. No.: 740,953

[22] Filed: Aug. 6, 1991

[30] Foreign Application Priority Data

Aug. 6, 1990 [DE] Fed. Rep. of Germany ....... 4024940

[51] Int. Cl.⁵ .............................................. G06F 15/46
[52] U.S. Cl. ....................................... 395/90; 395/85; 364/184; 364/187; 364/474.19
[58] Field of Search ............................. 395/90, 80, 85; 364/185, 184, 187, 474.19; 371/20.4

[56] References Cited

U.S. PATENT DOCUMENTS

| 4,511,975 | 9/1981 | Nozawa et al. ................. | 364/474 |
| 4,982,335 | 1/1991 | Isobe et al. ..................... | 364/148 |
| 5,001,641 | 3/1991 | Makino ........................... | 364/426.02 |

FOREIGN PATENT DOCUMENTS 8806214  4/1989  Fed. Rep. of Germany .
8812349  9/1989  Fed. Rep. of Germany .
2204426 11/1988  United Kingdom .

Primary Examiner—Allen R. MacDonald
Attorney, Agent, or Firm—Kenyon & Kenyon

[57] ABSTRACT

A method for transmitting a permission signal for the operation of a robot is provided. In order to detect whether a permission signal gets from a manual programming unit to a robot control without disturbance, the permission signal is modulated with an auxiliary signal, whose continuous presence at the location of the robot control is monitored. If the auxiliary signal is present, the permission signals are accepted. If the auxiliary signal is no longer present, an EMERGENCY-OFF is triggered. For reasons of safety, the condition of the signal flow is also a two-channel one.

9 Claims, 3 Drawing Sheets

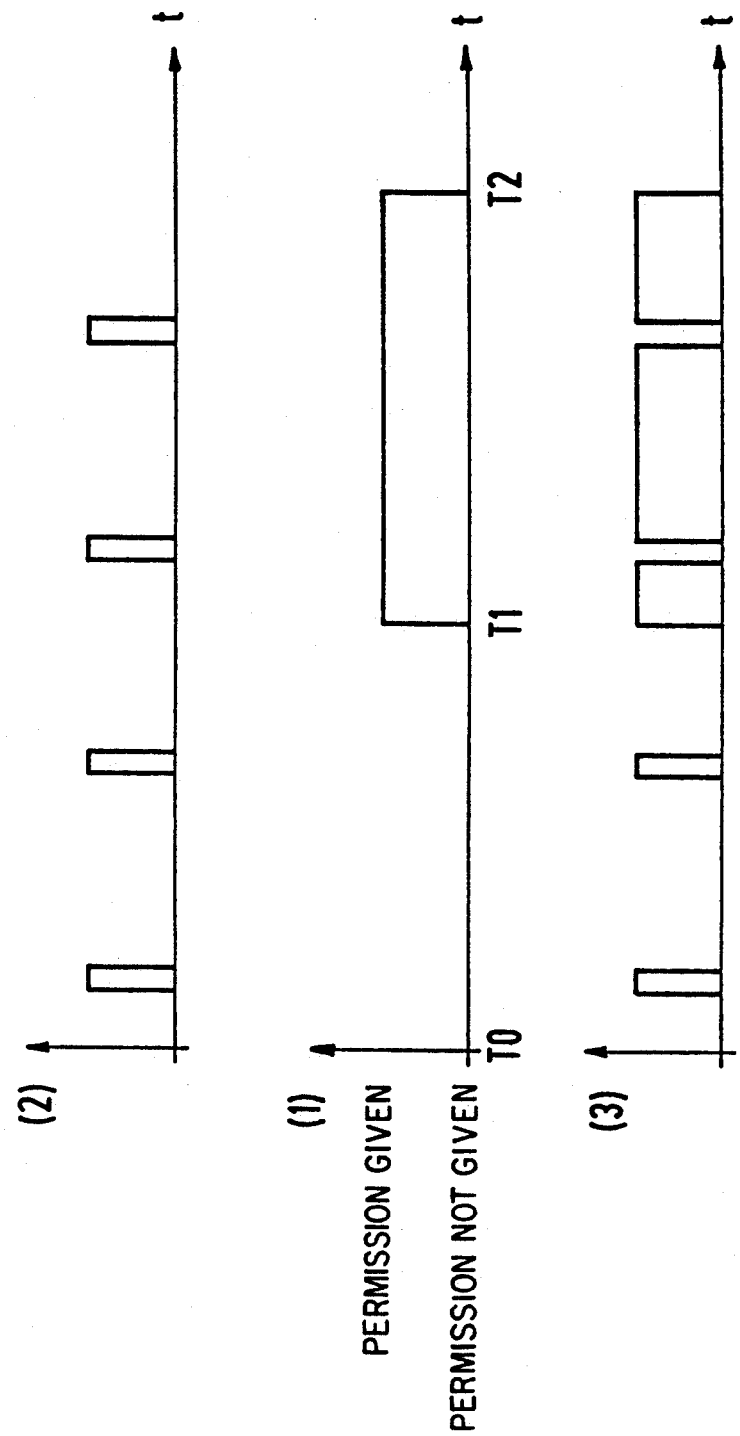

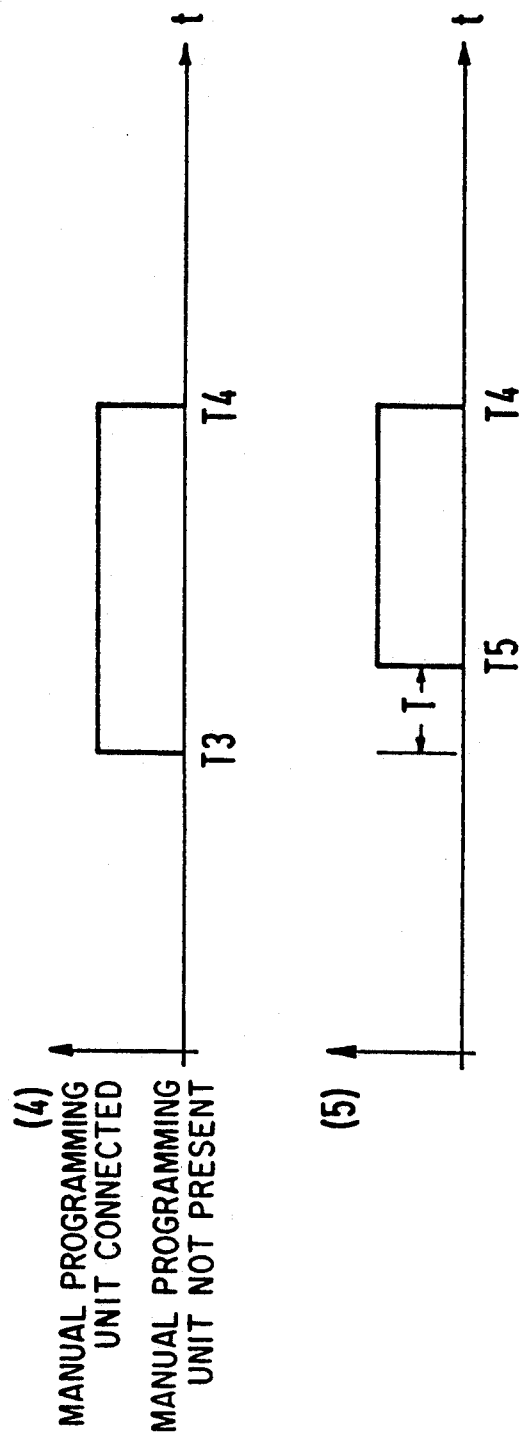

METHOD FOR TRANSMITTING A PERMISSION SIGNAL FOR THE OPERATION OF A ROBOT

BACKGROUND OF THE INVENTION

The present invention relates generally to a method for transmitting a signal for triggering a robot to operate or not operate, and more particularly to a method for transmitting such a signal which is referred to as a permission signal and is transmitted as a binary signal from a manual programming unit to the actual control of the robot via a line system indicating "Permission given" or "Permission not given" to operate.

A method for transmitting such a signal is used, for example, in the operation of devices disclosed in German Utility Model 88 06 214. In this reference a process of moving a robot is preset via a manual programming unit that is triggered whenever a permission signal is initialized by the operator of the manual programming unit by operating one of three permission keys. When these permission keys are not placed in a defined position, either because the operator has let go of the respective permission key or because the operator used the respective permission key spasmodically, it is ensured that the robot does not move. It is possible, however, that an interrupted movement of the robot can be restarted by the operator by correctly operating one of the permission keys. This distinguishes the function of the permission key from an EMERGENCY-OFF operating element which when triggered always results in a self-holding state which can be reversed only by a well-defined operation.

It is evident from the above discussion that the transmission of permission signals is nevertheless of importance for the safe operation of a robot.

The problem in the prior art is that there is no method for reliably transmitting permission signals from the location of the manual programming unit to the location of the actual robot control.

SUMMARY OF THE INVENTION

The present invention provides a method for transmitting a permission signal for the operation of a robot. In accordance with the method, the permission signal is transmitted from a manual programming unit to an actual control of the robot via a line system. The permission signal is a binary signal indicating either "Permission given" or "Permission not given". An auxiliary signal is added to the permission signal at the location of the manual programming unit. Whether or not the auxiliary signal is still being transmitted is detecting at the location of the robot control. A state signal simultaneously received in the control is accepted as a correct state signal only if the auxiliary signal is present. Finally, an EMERGENCY-OFF command is triggered in the absence of the auxiliary signal. If the transmission of the permission signal is disturbed, this results in a return to the safest stage of the system, namely the state EMERGENCY-OFF.

In one advantageous embodiment of the present invention, as long as the manual programming unit is not yet connected, a permission signal indicating "Permission not given", correctly provided with the auxiliary signal, is simulated at the location of the control with the aid of a generator which also supplies the auxiliary signal. This ensures that the components present at the location of the control, which are otherwise provided for processing the permission signal from the manual programming unit, will be continuously monitored.

Once the manual programming unit is connected, the permission signals of the manual programming unit are activated in the control only after a given delay time. Because of this, it is ensured that no brief interruptions of the auxiliary signal are caused by a delayed buildup of the supply voltages for the manual programming unit.

Because the circuitry of the system is designed with a two-channel technology engineered for safety, a very high safety level can be achieved despite the use of ordinary components.

BRIEF DESCRIPTION OF THE DRAWINGS

FIGS. 2 and 3 show some significant signal sequences utilized in the present invention.

DETAILED DESCRIPTION

Figure 1:
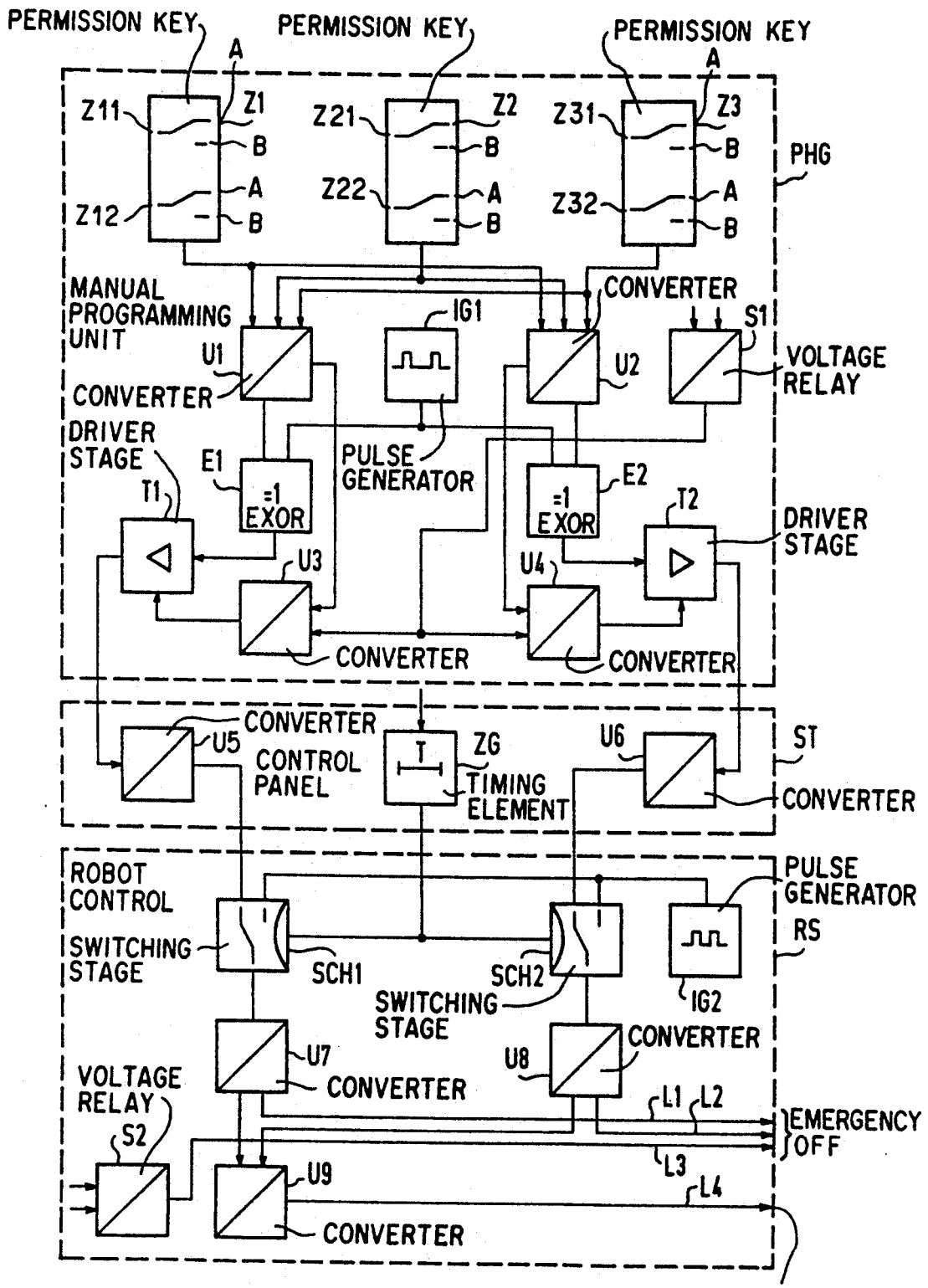
FIG. 1 shows a block diagram of the method of the present invention.

FIG. 1 shows a manual programming unit PHG, a control panel ST, and those elements of an actual robot control RS relevant to the present invention. Each of these features is shown within a box defined by dashed lines.

In the manual programming unit PHG three permission keys Z1, Z2 and Z3 are provided, of identical design. Each of these permission keys Z1 to Z3 can be moved into one of three positions; an "OFF" position, an "ON" position and a "PANIC" position. In principle, these three position switches can be obtained by a three-position switch as disclosed in German Utility Model 88 12 349, but it has been found more appropriate to use, instead of a specific three-position switch, two commercial two-position switches such as switches Z11 and, Z21 and Z22, or Z31 and Z32, which together can be used to produce the three desired switch positions.

If the two possible positions of the switches are "0" and "1" (A and B), the position "0" for both switches indicates the "OFF" state. Further, the position "1" for the first switch and the position "0" for the second switch indicates the "ON" state, and the position "1" for both switches indicates "PANIC". Also, the position "0" for the first switch and the simultaneous position "1" for the second switch would occur if there were an error in switching ("ERROR").

These logical relations can be detected in converters U1 and U2. For safety reasons both converters U1 and U2 operate in parallel, possibly using diverse technology. If one of the permission keys Z1 to Z3 is in the above-mentioned "ON" position, a logical "1" is signal triggered by converter U1 as well as by converter U2 and sent to the first input of an EX-OR element E1, E2. If permission is not given (i.e., "OFF" or "PANIC"), a logical "0" signal is transmitted to the output of converter U1 and to output of converter U2. If an "ERROR" configuration of the permission keys Z1, Z2 or Z3 occurs, or if more than one of the permission keys Z1 to Z3 are operated simultaneously, converter U1 or converter U2 triggers an interference signal that is supplied to a converter U3 or U4. This converter U3 or U4 is also informed of the detection by a voltage relay S1 that defined voltage states are not present in the manual programming unit PHG. In both cases, the converter U3 or U4 triggers a blocking signal for a driver stage T1, T2 disposed in the transmission path of the permission signal.

The manual programming unit further contains a pulse generator IG1, which is an essential component of the safety concept. The pulse generator IG1 sends an auxiliary signal to the second inputs of the EX-OR elements E1 and E2, for example in a pulse-interval ratio of 11%. Thus, the permission signals are modulated in the EX-OR elements E1 and E2 with the signal of the pulse generator IG1 as shown in the diagram of FIG. 2.

In FIG. 2, three signal sequences are arranged isochronous to each other. With respect to the middle signal sequence (1), assume that over a time period t, which is between a time T0 and a time T1, a state "permission not given" appears and between a time T1 and a time T2 the state "permission given" appears. The signal (2) at the output of the pulse generator IG1 is indicated above the signal sequence (1) just described. Mixing of the two signal sequences leads to a signal (3) as shown in the lower portion of FIG. 2.

Referring back to FIG. 1, the output signal of the EX-OR element E1 or E2 is supplied to the driver stage T1 or T2, respectively. Next this signal is transmitted to the control panel ST where it can be modulated, for example, in converters U5 and U6 according to the distance to be bridged. Further, a timing element ZG is provided at the control panel ST which, whenever the manual programming unit PHG is connected, after a period T, switches switching stages SCH1 and SCH2 of the robot control RS so that the switch position of the switching stages SCHI and SCH2 shown in the diagram is occupied. (The signal states at the timing element ZG will be discussed below.) In this position, the output signals of converters U5 and U6 are transmitted, via the switching stages SCHI and SCH2, to converters U7 and U8. In view of the safety concept, converters U7 and U8 detect whether or not the auxiliary signal that had been sent by the pulse generator IG1 is still present as a modulation of the state signals. If, in fact, the auxiliary signal is no longer present, an EMERGENCY-OFF must immediately be triggered via a line L1 or L2, because either there is in fact a defect of the switching elements or an interruption of the line conduction between the individual units. But, if the auxiliary signal still exists, the permission signal is detected by converter U7 or by converter U8 as "permission given" or "permission not given". A corresponding signal then goes to a converter U9, which, when both output signals of the converters U7 and U8 indicate identical permission states with regard to the permission signal, relays a resultant permission signal "permission given" or "permission not given" via a line L4 to the circuit elements (not shown for greater clarity) of the robot control RS or the robot.

As in the manual programming unit PHG, a voltage relay S2 may be provided in the robot control RS which responds to expected disturbances of the voltage curve by triggering an EMERGENCY-OFF, in this case via a line L3.

If the manual programming unit PHG is separated from the control panel ST, the auxiliary signal of pulse generator IG1 will of course no longer be received by the converters U7, U8. The absence of the auxiliary signal from the manual programming unit would, however, lead to an EMERGENCY-OFF although actually only a normal operation has occurred. To avoid this condition, when separating the manual programming unit PHG from the control panel ST a pulse generator IG2 of the robot control RS is activated, which also generates a signal corresponding to the auxiliary signal of pulse generator IG1.

To illustrate this situation, the diagram in FIG. 3 represents the response of the timing element ZG. In an upper part (4) of the diagram, signals "manual programming unit not present" and "manual programming unit connected" are shown along a time t. The state "manual programming unit connected" is assumed to be present between the times T3 and T4. A signal to that effect can be generated, for example, by connecting the plug of the manual programming unit PHG via plug bridges. When such a signal is supplied to the timing element ZG, there occurs in the latter a turn-on delay of time T, and accordingly there results a signal (5). Between the times T5 and T4 the signal (5) triggers the switch position of the switching stages SCH1 and SCH2, as indicated in FIG. 1. Otherwise the switching stages SCHI and SCH2 are operated in a switching position not shown.

In the position shown, signals from U5 and U6 that include the auxiliary signals of the pulse generator IG1 are transmitted to the converter U7 or U8. In the switch position not shown the pulses from pulse generator IG2 are transferred to converters U7 and U8.

For the transmission of the permission signals a two-channel signal flow is always assumed, and for safety reasons the individual elements in the channels are designed from diverse technological areas.

Naturally, it is also possible to relay the permission signals generated by the converters U1 and U2 to additional safety devices or to specific data processing equipment of the system over additional signal paths.

What is claimed is:

1. A method for transmitting an operation signal from a manual programming unit to a robot controller via a line system comprising the steps of:

generating a permission signal as a binary signal indicative of a "Permission given" or "Permission not given" state for the robot;

modulating the generated permission signal using an auxiliary signal produced by a pulse generator by adding the auxiliary signal to the permission signal at the location of the manual programming unit to produce the operation signal;

transmitting the operation signal form the manual programming unit via the line system;

detecting the transmitted operation signal at the location of the robot controller;

determining whether or not the auxiliary signal is included in said detected operation signal;

accepting a permission signal simultaneously received in the robot controller as a correct permission signal only if the determining step determines that the auxiliary signal is included in the detected operation signal; and triggering an EMERGENCY-OFF command if the determining step determines that the auxiliary signal is not included in the detected operation signal.

2. The method of claim 1 wherein when the manual programming unit is not yet connected to the robot control via the line system, the method further comprises the step of simulating the combination of the permission signal indicative of a "Permission not given" state and the auxiliary signal, said simulating step occurring at the location of the robot control with the aid of the generator supplying the auxiliary signal.

3. The method of claim 2 further comprising the step of activating the effect of the permission signals of the manual programming unit in the robot control after connection of the manual programming unit after a predetermined time delay.

4. The method of claim 3 wherein the line system is formed from a two-channel technology engineered for safety.

5. The method of claim 2 wherein the line system is formed from a two-channel technology engineered for safety.

6. The method of claim 2 wherein said auxiliary is a mark-to-space signal produced by a pulse generator.

7. The method of claim 2 wherein said auxiliary signal is a mark-to-space signal produced by a pulse generator.

8. The method of claim 1 wherein the line system is formed from a two-channel technology engineered for safety.

9. The method of claim 1 wherein said auxiliary signal is a mark-to-space signal produced by a pulse generator.

* * * * *